(12) United States Patent
Coskun et al.

(10) Patent No.: US 12,713,249 B2
(45) Date of Patent: Aug. 18, 2026

(54) METHODS AND SYSTEMS FOR CONFIGURING A RECONFIGURABLE INTELLIGENT SURFACE

(71) Applicant: Adeia Guides Inc., San Jose, CA (US)

(72) Inventors: Mustafa Coskun, Kocasinan (TR); Vehbi Cagri Gungor, Melikgazi (TR); Dhananjay Lal, Englewood, CO (US)

(73) Assignee: Adeia Guides Inc., San Jose, CA (US)

( * ) Notice: Subject to any disclaimer, the term of this patent is extended or adjusted under 35 U.S.C. 154(b) by 354 days.

(21) Appl. No.: 18/204,176

(22) Filed: May 31, 2023

(65) Prior Publication Data

US 2024/0406752 A1 Dec. 5, 2024

(51) Int. Cl.
*H04W 16/00* (2009.01)
*H04W 16/28* (2009.01)

(52) U.S. Cl.
CPC .................................. *H04W 16/28* (2013.01)

(58) Field of Classification Search
CPC ..... H04W 16/28; H04W 4/02; H04B 7/04013
See application file for complete search history.

(56) References Cited

U.S. PATENT DOCUMENTS 12,309,614 B1 * 5/2025 Chen .................... H04W 16/14
2023/0258759 A1 * 8/2023 Wang .................... G01S 5/0036
455/456.1

OTHER PUBLICATIONS

"NTT and NTT Docomo Trial First Use of User-tracking Metasurface Reflector for Extreme Mobile Coverage in Current 5G and Coming 6G Era", NTT Docomo, Retrieved from URL: https://www.docomo.ne.jp/english/info/media_center/pr/2021/1112_00.html, Nov. 12, 2021, 6 Pages.

"Reconfigurable Intelligent Surfaces (RIS)in 6G: Advantages and Disadvantages", RF Wireless World, Retrieved from URL: https://www.rfwireless-world.com/Terminology/Advantages-and-Disadvantages-of-Reconfigurable-Intelligent-Surface.html, 2026, 11 Pages.

"ZTE builds efficient way to 5G-Advanced and 6G with RIS solution", ZTE, Retrieved from URL: https://www.zte.com.cn/global/about/news/20220301e8.html, Mar. 1, 2022, 8 Pages.

Adepegba AA., "Multi-agent area coverage control using reinforcement learning." In The Twenty-Ninth International Flairs Conference, 2016, pp. 368-373.

Araghi A., et al., "Reconfigurable Intelligent Surface (RIS) in the Sub-6 GHz Band: Design, Implementation, and Real-World Demonstration", IEEE Access, vol. 10, 2022, pp. 2646-2655.

Bjorson E., "Presentation Slides", Github, Retrieved from URL: https://github.com/emilbjornson/presentation_slides, 2025, 7 Pages.

Fara R., et al., "A Prototype of Reconfigurable Intelligent Surface with Continuous Control of the Reflection Phase," IEEE Wireless Communications, vol. 29, No. 1, Feb. 2022, 7 Pages.

Feng, Keming, Qisheng Wang, Xiao Li, and Chao-Kai Wen. "Deep reinforcement learning based intelligent reflecting surface optimization for MISO communication systems." IEEE Wireless Communications Letters 9, No. 5 (2020): 745-749.

(Continued)

*Primary Examiner* — Md K Talukder
(74) *Attorney, Agent, or Firm* — HG LAW LLP

(57) ABSTRACT

Systems and methods are described for configuring a reconfigurable intelligent surface, RIS, to direct signals during a time period in at least one direction based on a spatio-temporal model. The spatio-temporal model of users of a wireless network within a region is received.

18 Claims, 8 Drawing Sheets

(56) References Cited

OTHER PUBLICATIONS

Feng, X., Ling, X., Zheng, H., Chen, Z., & Xu, Y., "Adaptive multi-kernel SVM with spatial-temporal correlation for short-term traffic flow prediction," IEEE Transactions on Intelligent Transportation Systems, vol. 20, No. 6, 2001-2013, 2018.
Li S., et al., "Robust multi-agent reinforcement learning via minimax deep deterministic policy gradient," In Proceedings of the AAAI Conference on Artificial Intelligence, vol. 33, No. 01, 2019, pp. 4213-4220.
Liaskos C., et al., "Software-Defined Reconfigurable Intelligent Surfaces: From Theory to End-to-End Implementation," Proceedings of the IEEE, 2022, 26 Pages.
Nemati M., et al., "RIS-assisted coverage enhancement in millimeter-wave cellular networks," IEEE Access, vol. 8, Oct. 15, 2020, pp. 188171-188185.
Pan C., et al., "Reconfigurable Intelligent Surfaces for 6G Systems: Principles, Applications, and Research Directions" IEEE Communications Magazine, vol. 59, No. 6, Jun. 2021, 7 Pages.
X. Lei et al., "Reconfigurable Intelligent Surface-Based Symbiotic Radio for 6G: Design, Challenges, and Opportunities," IEEE Wireless Communications, vol. 28,No. 5, Oct. 2021.
Xu X., et al., "Graph-embedded multi-agent learning for smart reconfigurable THz MIMO-NOMA networks," IEEE Journal on Selected Areas in Communications 40, No. 1, 2021, pp. 259-275.
Yuan X., et al., "Reconfigurable-Intelligent-Surface Empowered Wireless Communications: Challenges and Opportunities," IEEE Wireless Communications, vol. 28, No. 2, Apr. 2021, 7 Pages.
Zhao M-M., "Intelligent reflecting surface enhanced wireless networks: Two-timescale beamforming optimization," IEEE Transactions on Wireless Communications 20, No. 1, 2020, pp. 2-17.

* cited by examiner

200
Server
204
Control Circuitry
210
Storage
214
Processing Circuitry
216
I/O Path
212
Communication Network(s)
208
Content Database
206
Computing Device
202
Control Circuitry
218
Storage
228
Processing Circuitry
230
I/O Path
220

600
602
Base station
604
RIS
606
User device
Provide time sync
608
Next time slot is approaching?
610
Determine users not adequately served by beams in next time slot
612
Feedback to indicate to user center of closest region
614
Next time slot?
616
Display warning and/or guidance
618
Next time slot
OR
Next time slot
620

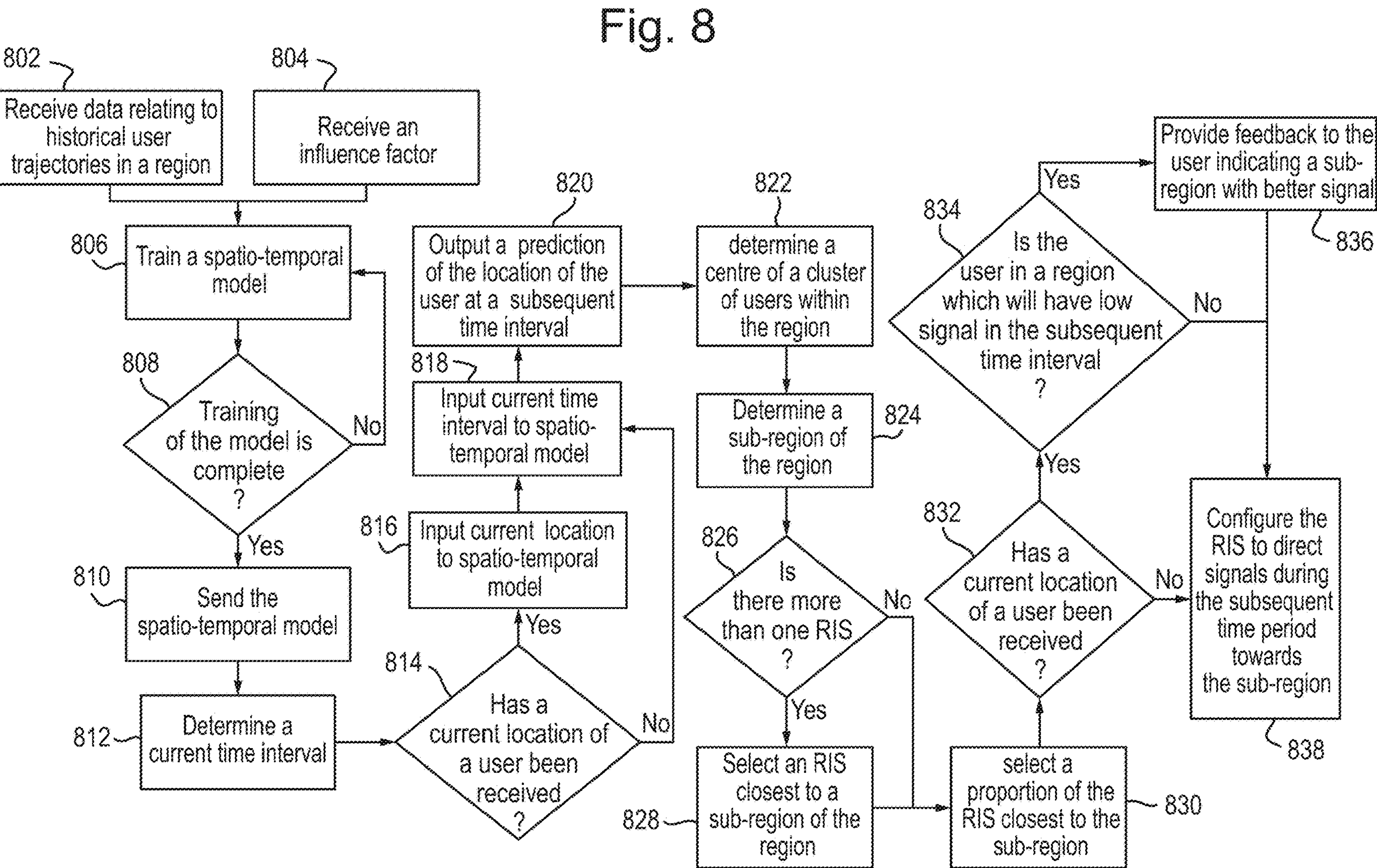

Fig. 8
802
Receive data relating to historical user trajectories in a region
804
Receive an influence factor
806
Train a spatio-temporal model
808
Training of the model is complete ?
No
Yes
810
Send the spatio-temporal model
812
Determine a current time interval
814
Has a current location of a user been received ?
Yes
No
816
Input current location to spatio-temporal model
818
Input current time interval to spatio-temporal model
820
Output a prediction of the location of the user at a subsequent time interval
822
determine a centre of a cluster of users within the region
824
Determine a sub-region of the region
826
Is there more than one RIS ?
Yes
No
828
Select an RIS closest to a sub-region of the region
830
select a proportion of the RIS closest to the sub-region
832
Has a current location of a user been received ?
Yes
No
834
Is the user in a region which will have low signal in the subsequent time interval ?
Yes
No
836
Provide feedback to the user indicating a sub-region with better signal
838
Configure the RIS to direct signals during the subsequent time period towards the sub-region

METHODS AND SYSTEMS FOR CONFIGURING A RECONFIGURABLE INTELLIGENT SURFACE

BACKGROUND

The present disclosure relates to methods and systems for configuring a reconfigurable intelligent surface (RIS). Particularly, but not exclusively, the present disclosure relates to configuring a RIS for users of a wireless network.

SUMMARY

With the recent advances of embedded systems and wireless communication technologies, it is expected that networks such as 5G may support applications such as digital twins, immersive extended reality (XR), high-fidelity mobile holograms, intelligent transportation systems, autonomous systems, and brain-computer interfaces. However, all these applications have high quality of experience (QoE) requirements, such as ultra-high data rates, high reliability, and low latency, which may not find sufficient support in existing networks. Considering the large amount of available bandwidth at higher frequencies, communications in the mmWave (30 GHz-300 GHz) and even terahertz (THz) bands (above 300 GHz) will likely be used for these applications and future wireless services.

These high frequency bands suffer from blockages, limited coverage, and severe propagation attenuation and water-molecule absorption loss, where high frequencies limit the propagation distance. To address these issues, more densely deployed base stations (or access points) may assist in extending network coverage and eliminating blockages. However, this is a costly solution in terms of both infrastructure deployment and energy consumption. Hence, new cost effective and energy-efficient technologies are required to address these challenges.

Recently, reconfigurable intelligent surfaces (RISs) have been proposed as a technology to address severe path attenuation of high frequency bands and support high data rates of mobile users in non-line-of-sight (NLoS) areas. RIS technology operates by intelligently steering reflected electromagnetic waves, from a base station, towards alternate directions, such that useful signals can be directed toward the destined user. Overall, a motivation for RIS technologies is that this technology can be implemented with relatively low energy consumption and low cost, since a RIS does not need to employ baseband signal processing modules and radio frequency (RF) chains in order to direct signals.

Some approaches for directing signals towards particular users using RIS technologies assume there is only one RIS in the environment, and the optimization of a signal level is considered only for one user. Furthermore, these approaches rely on having a real-time location of the user in order that a precise beam can be formed towards them. However, in practice, there may be more than one user for whom beamforming is required, and it may be difficult to obtain precise locations of the users in real-time.

Systems and methods are provided herein for improving methods for directing signals towards users using RIS technology, e.g., in an indoor and/or an outdoor environment. In some examples, signals may be intelligently steered from a base station toward desired locations in a predictive manner (e.g., rather than in a reactive manner). For example, by using a spatio-temporal model which predicts the locations of users over a time period to configure a RIS, the need for real-time dynamic beamforming calculations at the RIS may be reduced. For example, by pre-determining likely locations of users in a region, it is not necessary to perform calculations or reconfigure the RIS in order to determine the optimum configuration of the RIS for directing signals in real-time. Furthermore, the spatio-temporal model may be used to determine beamforming implementation, which may enable a greater number of users within a region to be served within a time period. In an example, beam patterns or schedule(s) for implementing the beam patterns may be determined and implemented based on predicted locations of users (e.g., indicated by the spatio-temporal model). In some examples, the predicted locations may be determined based on observed historical traffic of users.

According to the systems and methods described herein, a spatio-temporal model of users of a wireless network within a region is received. The spatio-temporal model may be a traffic profile, or model, of users within the region. For example, the spatio-temporal model may be a model of users' movements within a region, such as a shopping mall, over a time period such as a day. The spatio-temporal model may be a model of one user, or a plurality of users. A reconfigurable intelligent surface, RIS, is configured to direct signals during a time period in at least one direction based on the spatio-temporal model. For example, the spatio-temporal model may output information on the likely, or predicted, location of users within the region at particular times over the course of a day (e.g. based on historical movements of the users within the region over the same time period each day). The RIS may be configured to direct signals in directions which will serve the greatest number of users. For example, the spatio-temporal model may indicate regions where groups, or clusters, of users are likely to congregate at certain times of day, where the signals may be directed to the centers of those regions in order that a larger number of users are served. In an example, the RIS comprises multiple discrete elements with properties that may be modified or controlled (e.g., in order to control a direction in which incident signals are directed). For example, configuring the RIS may involve modifying the impedance of one or more RIS elements. By modifying the impedance of an RIS element, the system modifying the impedance can thereby manipulate properties of reflected signals (e.g., amplitude, phase). In another example, configuring the RIS may involve modifying an angle of the RIS elements to redirect incident signals. In further examples, where the elements of the RIS are antennas which form an array, modifying the RIS may comprise controlling or modifying properties of the array of antennas to dynamically adjust the radiation pattern of the antennas.

In some examples, the spatio-temporal model indicates a predicted location of at least one user within the region at time intervals of the time period. For example, the time period may be a day, where time intervals are time slots making up the time period, such as 10-minute time intervals over the course of the day. The spatio-temporal model may indicate the predicted location of users at each time interval. For example, the spatio-temporal model may indicate the location of clusters of users during a particular time interval. In some examples, during a time interval, the RIS is configured to direct signals in at least one direction based on the predicted location of the at least one user at that time interval. For example, returning to the mall example, the RIS may direct the signal to a cafeteria between 12-1 PM based on a prediction that the cafeteria may include a relatively large cluster(s) of people during that time period. After the 12-1 PM period, the RIS may direct signals to other locations. In some examples, where there is one main cluster of users, the RIS may direct signals in the direction of the main cluster. Alternatively, where there are several clusters of users, the RIS may direct signals in directions corresponding to the location of each cluster, for example, to the center of each cluster. In some examples, particular clusters may be prioritized, for example based on the size of the cluster, e.g., where a larger cluster may be prioritized over a smaller cluster, such that the RIS is configured to direct a larger proportion of signals to a cluster having a higher level of priority. A cluster may be prioritized based on the required quality of service (QOS) of users of that cluster. For example, users using extended reality devices may require a higher QoS than users who are not using extended reality devices. Therefore, where it is determined that a cluster comprises a number of users with high QoS requirements, that cluster may be prioritized over another cluster comprising a lower number of users with high QoS requirements.

In some examples, the spatio-temporal model indicates least one sub-region of the region to which signals are to be directed. For example, the region may be divided into sub-regions based on the grouping of users, e.g., based on the location of clusters of users. In some examples, a sub-region corresponds to a predicted cluster of users within the region, for example, the location of a predicted cluster of users. In an example, clustering algorithms may be used to determine the centers of clusters of users. A Voronoi diagram(s) may then be used to divide the region into sub-regions based on the centers of the clusters. The spatio-temporal model may incorporate, or be based on, such algorithms, in order to indicate the location of a sub-region or cluster.

In some examples, the RIS is configured to direct signals to at least one sub-region of the region based on the spatio-temporal model. For example, the spatio-temporal model may indicate a sub-region to which signals should be directed at a particular time period, and the RIS may therefore direct signals to that sub-region during that time period. In some examples, the RIS is configured to direct signals to a center of at least one sub-region of the region based on the spatio-temporal model.

In some examples, the spatio-temporal model is produced based on data relating to historical user trajectories (e.g. any of location, direction travelled, speed travelled) in the region. For example, the movement of users within a region may be tracked over a series of corresponding time periods, such as a series of days. The tracked behavior of users may then be used to predict the movement, or location of users in time slots of a time period, for a given time period, such as any given day. The spatio-temporal model may be configured to provide different predictions of users' movement for different types of time period. For example, the movement of a user on a weekday may be different to the movement of a user on a weekend. Similarly, the movement of a user on a national holiday may be different to a standard day. The spatio-temporal model may therefore determine a prediction of the movement of users based on different types of time periods, where a time period type corresponding to the current time period may be considered for the prediction. In some examples, the spatio-temporal model is determined based on at least one influence factor which influences user trajectory in the region. For example, users may be more likely to congregate around a shop having a sale than they would otherwise, and therefore the spatio-temporal model may use this information to generate an indication of the location of users.

In some examples, a current location of at least one user is received and, based on the current location and the spatio-temporal model, a future location of the at least one user at a time interval of the time period is predicted. For example, where the region is a shopping mall, the entrance that the user enters the mall through and the initial trajectory of the user may be used in order to predict the future location of the user, for example, in the next time slot, or a subsequent time slot, based on previously assessed user behavior. In particular, flow prediction algorithms may be used in order to predict the future location of users based on their current location. In some examples, the RIS is configured to direct the signals based on the predicted future location of at least one user at the time interval. For example, the spatio-temporal model may use the current location of the user to predict a future location of the user, so that the region(s) to which the RIS then directs signals may be based on the predicted future location of the user at the future time interval.

In some examples, a proportion of the RIS to be configured to direct signals to a sub-region of the region is determined. For example, different proportions of the RIS may be used to direct signals to different sub-regions. For example, where it is determined that there are two clusters of users, but one cluster is smaller than the other, the RIS may use a greater proportion of its surface to direct signals to the larger cluster than the proportion used to direct signals to the smaller cluster. In some examples, a proportion of the RIS which is closest to a center of a sub-region is used to direct signals to that sub-region. For example, by using a proportion of the RIS which is closest to a center of a sub-region, signal fading may be minimized.

In some examples, a plurality of reconfigurable intelligent surfaces, RISs, are configured to direct signals in directions based on the spatio-temporal model. A RIS may be configured based on the direction signals are to be directed by other RISs. For example, by using a plurality of RISs, each RIS may direct signals to different sub-regions of the region, or may be used to beamform signals to be concentrated in a particular sub-region or sub-regions.

In some examples, the region is divided into sub-regions, and wherein a RIS which is closest to a center of a sub-region of the region is used to direct signals to that sub-region. For example, each RIS of a plurality of RISs may be used to direct signals to a sub-region to which the RIS is closest. Thus, maximum area signal coverage may be achieved.

In some examples, feedback is provided to the user (e.g., to a user device) indicating a location of a sub-region of the region to which the RIS is directing signals, or will be directing signals in a next time interval of the predetermined time period, relative to a current position of the user. For example, where a user is in an area of low signal, a message may be sent to a user device indicating a location in which they may receive higher signal. In another example, the user may receive a message indicating that the signal in their location is to be lowered, and may indicate a location where they may continue to receive good signal. In a further example, where the user is using extended reality (ER) technology, such as AR glasses, an extended reality device may direct the user to a location of better signal, for example, by using visual indicators such as markers on the floor in order to show the user where to go.

According to the systems and methods described herein, a spatio-temporal model of user devices within a region may be received. A reconfigurable intelligent surface, RIS, may be configured to direct signals during a time period in at least one direction based on the spatio temporal model.

According to the systems and methods described herein, a reconfigurable intelligent surface (RIS) uses a spatio-temporal model of the movement of users within a region to direct signals within the region.

According to the systems and methods described herein, a reconfigurable intelligent surface (RIS) uses a traffic profile of the movement of users within a region to direct signals within the region.

According to the systems and methods described herein, a spatio-temporal model of users within a region is produced based on historical data on the movement of users within the region.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 8 illustrates a flow chart for configuring a reconfigurable intelligent surface, RIS, in accordance with some examples of the disclosure.

DETAILED DESCRIPTION

Figure 1:
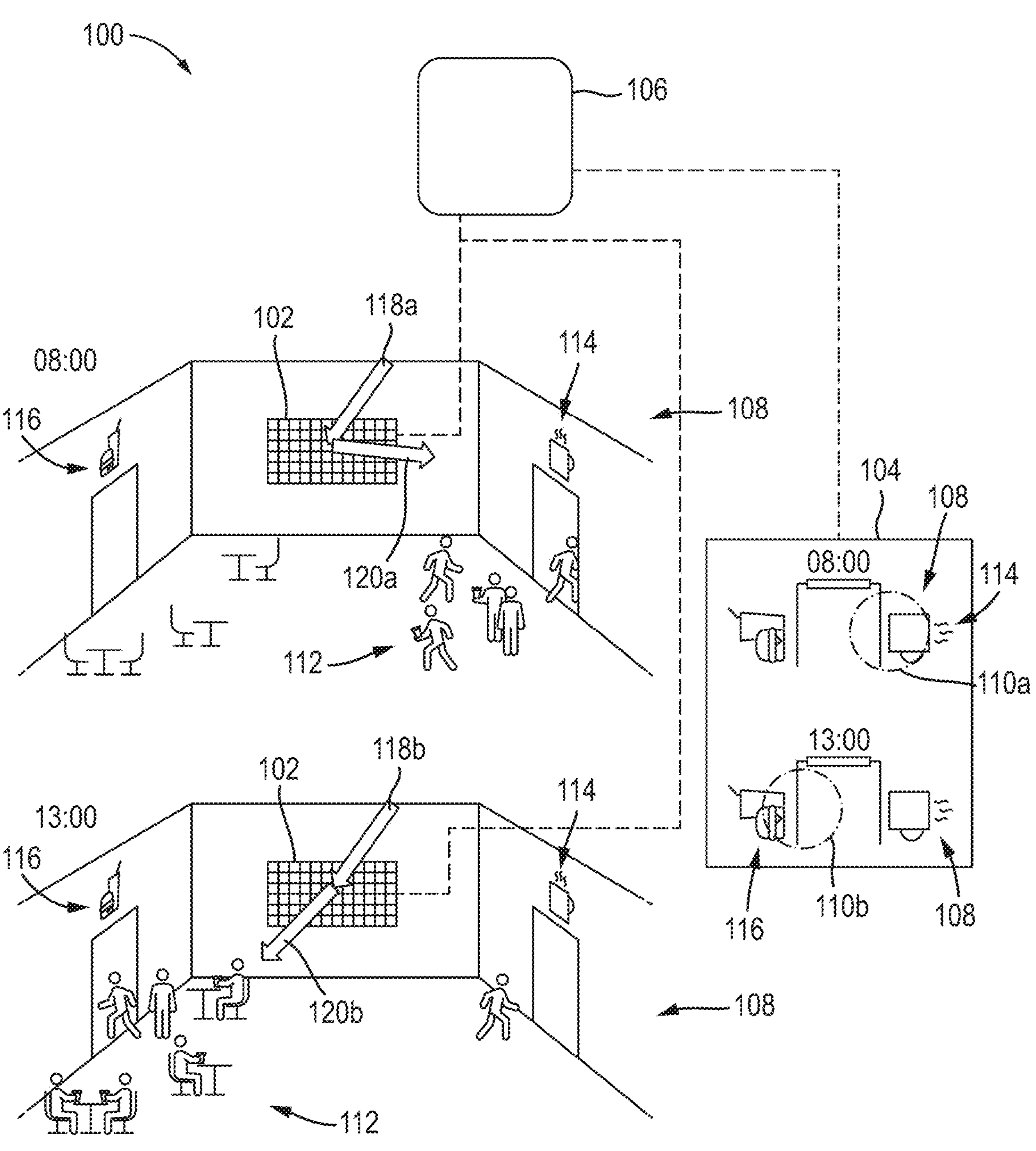
FIG. 1 illustrates an overview of the system for configuring a reconfigurable intelligent surface, RIS, in accordance with some examples of the disclosure.

As is described above, reconfigurable intelligent surface (RIS) technologies have been proposed to address path attenuation of high frequency bands and support high data rates of mobile users in non-line-of-sight (NLoS) areas. In particular, RISs may be intended to steer reflected electromagnetic waves, or signals, from a base station, in other directions, for example, in order to improve network coverage in areas of low signal.

A RIS as referred to herein may have any structure which enables redirection of signals (e.g., electromagnetic waves), and/or which is able to control the characteristics of signals (e.g., reflection, refraction, absorption, focusing and/or polarization). A RIS may absorb a signal incident on the RIS, which may then be processed by a microcontroller to be reproduced and transmitted in a specific direction(s). In an example, a RIS may comprise multiple discrete elements with properties that may be modified or controlled (e.g, by a controller of a RIS) in order to direct signals. For example, a RIS may comprise an antenna array of electrically tunable reflecting antennas, where the antennas may be passive antenna elements which can be used to dynamically adjust radiation patterns. In a further example, the RIS may comprise a metasurface comprising a plurality of discrete elements. For example, a RIS may direct signals in particular directions by modifying the impedance of one or more RIS elements. By modifying the impedance of an RIS element, the system modifying the impedance can thereby manipulate properties of reflected signals (e.g., amplitude, phase). In another example, a RIS may direct signals in particular directions by altering the angle of individual elements.

As is described above, a RIS (also termed an intelligent reflecting surface, a hardware or software-controlled metasurface) may comprise a passive metasurface. For avoidance of doubt, a metasurface is considered to be a surface that controls the wavefront of electromagnetic waves by imparting local, gradient phase shifts to the incoming waves. An ideal metasurface is a continuous surface (e.g. a two dimensional surface) which is able to continuously steer surfaces in any direction, however, it will be appreciated that such a surface may be impractical in a real-world environment. Generally, a metasurface which may be used in RIS applications is a semi-dynamic surface comprising a plurality of discrete elements (e.g., the surface is divided into a plurality of elements), each element being configurable in order to change its phase, such that electromagnetic waves, or signals, incident on the elements may be propagated in particular directions. An element of a RIS may comprise a switch (e.g. a diode) connected to a RIS controller configured to control elements of the RIS, where the controller may control the phase of each element of the RIS. The RIS may be configured to direct signal in a particular direction by controlling the angle of discrete elements. For example, the angle ($\theta_1, \ldots, \theta_n$) of each element (1, . . . n), e.g., an angle given from a "flat" position where the element lies in the plane of the RIS, may be independently controlled (e.g., using software commands and/or hardware), or set, so that collectively elements of a RIS can direct signals to a particular area (for example, where the angle of an element is currently 70°, and the required angle of the RIS element is 80° in order that signals are instead directed by that element of the RIS to a different area, the angle of the RIS element may be altered by 10°). An element of a RIS may utilize a particular angle in order to direct signals to a particular area, whereas another element of the RIS may utilize a different particular angle in order to direct signals to the same area. The required angle of an RIS element to direct signals incident on the RIS element to a particular area may be further based on the angle of incidence of the signal. The phases of the elements may be controlled by the Physical-Layer of a network, for hardware-level adjustments of the phase of patches, and/or by the Network-Layer of the network, for grouping elements and adding wireless communication functionalities on these grouped elements. For example, additional functionalities may be provided at the software level, which may further control the RIS elements to absorb signals, and/or to convey a signal to neighboring elements to propagate the signal towards the desired area.

The use of RIS technology has various advantages. Where passive reflecting elements are used in a RIS, there is no need to implement analog-to-digital conversion (ADC) or digital-to-analog conversion (DAC) along with amplifier components as used in traditional relays, or any transmitting elements. Thus, a RIS is a more cost effective solution for diverting signals. Furthermore, as active elements are not required, additional electromagnetic waves do not need to be transmitted, thereby improving energy efficiency. Additionally, since a RIS may comprises a large number of lightweight antenna elements in a compact space, the RIS may be relatively easy to implement, flexible, and scalable to deploy. As a RIS can be fabricated to be lightweight, it can readily be installed on walls, ceilings, street lamps, signage outdoors, and billboards, for example.

Users of a wireless network who do not have a direct line of sight to a base station or access point (e.g., due to objects between the user and the base station or access point) may suffer from reduced coverage. The use of a RIS in such an instance may enable signals to be directed to the user in order to improve the coverage for the user. Furthermore, network coverage may be extended to cell edge users by using RIS technology. A RIS may additionally be configured to steer all signals within a particular band towards a dead zone or outage area, and may additionally improve spectrum efficiency by providing extra spatial diversity gain. Moreover, where a large number of elements are provided on a RIS, powerful beamforming gain may be provided to improve spectrum efficiency.

Thus, RIS technologies provide a new approach to reduce the deployment cost, shorten the deployment period, reduce network energy consumption, and facilitate the construction of high-efficiency networks by intelligently controlling the propagation environment of electromagnetic waves.

Some approaches of configuring a RIS for the directing of signals attempt to find an optimum or suboptimum configuration of a RIS surface by adjusting the surface of RIS in real-time. However, this is impractical in a real-world scenario since the problem itself is an NP-hard problem (e.g., the problem cannot be solved by a computer deterministically within a known amount of time, i.e., to get the right solution a computer must either guess or iterate infinitely to try and find a solution).

Methods and systems are described herein for the prediction of the location of users to whom signals may be directed, so that RISs elements can be adjusted to direct signals to predetermined locations, rather than requiring instantaneous calculations.

FIG. 1 illustrates an overview of a system 100 for configuring a reconfigurable intelligent surface, RIS, 102 to direct signals during a time period in at least one direction based on a spatio-temporal model 104. In particular, the example shown in FIG. 1 illustrates a RIS 102 which is communicatively coupled to a RIS controller 106 (e.g., via a wired or wireless network). The RIS controller 106 in this example is configured to configure the reconfigurable RIS to direct signals in particular directions. For example, the RIS controller 106 is configured to alter the configuration of the RIS in order to redirect signals incident on the RIS. The RIS 102 of this example comprises a plurality of elements. The RIS controller 106 may alter the configuration of each of the elements of the RIS independently. The configuration of the elements of the RIS may be altered, for example, by altering the phase of some or all of the RIS elements, altering the angle of the RIS elements, and/or altering the impedance of the RIS elements. In some examples, the elements may be grouped, whereby elements belonging to the same group may be configured to direct signals in the same or similar direction(s).

Figure 2:
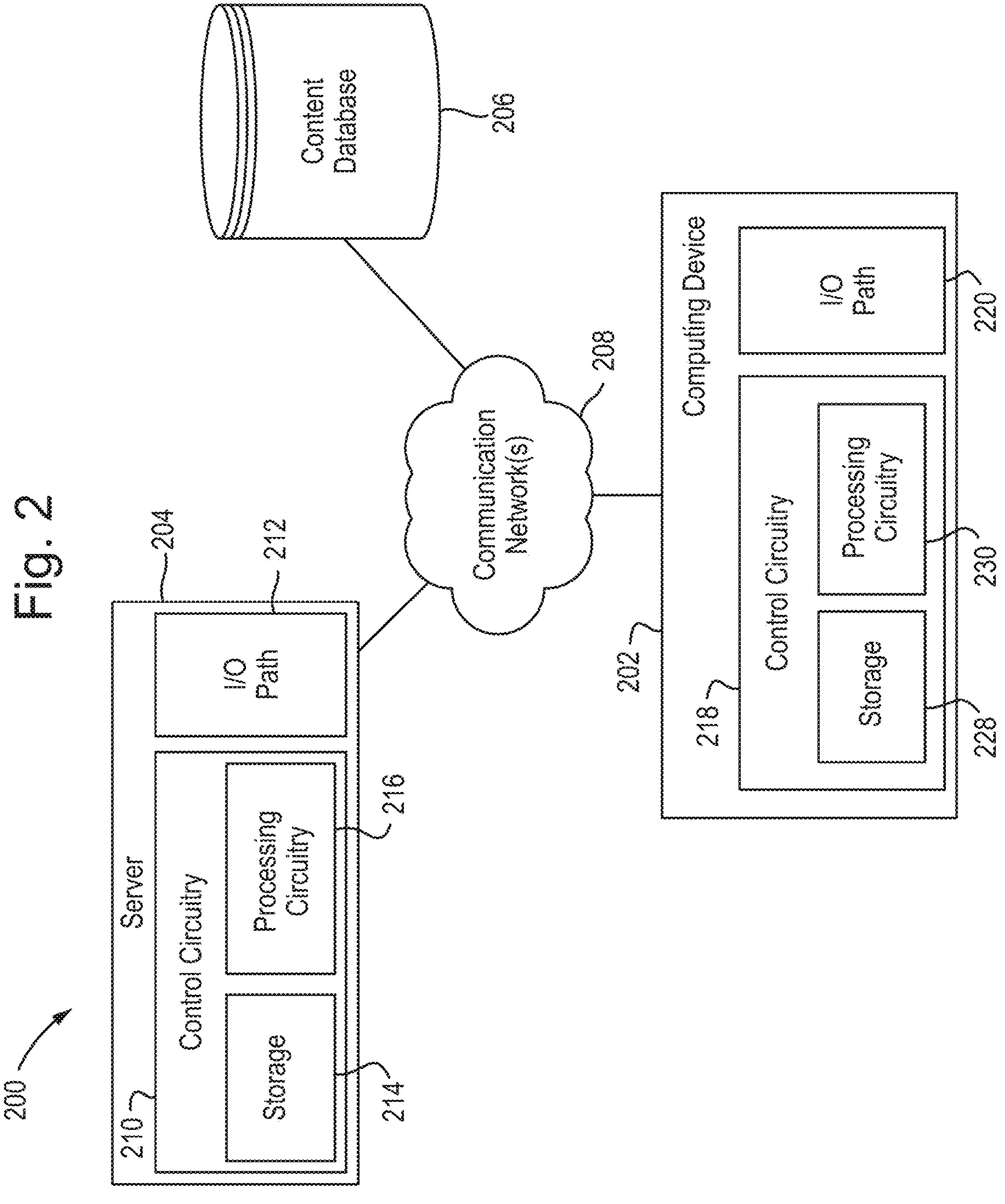
FIG. 2 is a block diagram showing components of an example system for configuring a reconfigurable intelligent surface, RIS, in accordance with some examples of the disclosure.

The RIS controller 106 may receive the spatio-temporal model 104. In some examples, the spatio-temporal model 104 is received from a network node (such as a base station), or from a server. In other examples, the spatio-temporal model 104 is received at the RIS controller 106 from a control system, for example, controlling one or a plurality of RISs. The control system may be a centralized control system, for example, a central control system that manages one or more RISs serving a region. The control system may equally be a decentralized control system, for example, by dividing an environment, such as an indoor or outdoor environment, into different regions, where each region comprises at least one RIS governed by a controller, and where the controllers may communicate with one another (particularly if the RIS of one region will affect another region). In further examples, not shown in this Figure, the spatio-temporal model 104 may be received at a control system (e.g. a server based control system as illustrated in FIG. 2 below), where the RIS controller 106 then receives instructions on how the RIS 102 should be configured at a particular time interval (e.g. rather than receiving the model itself). For example, the control system (e.g., controlling a plurality of RISs) may then provide to the RIS controller 106 instructions on where the RIS 102 should direct signals at a particular time interval, or instructions on particular configuration of elements of the RIS at a particular time interval. The control system may receive the spatio-temporal model 104, for example, from a base station or other network node. Similarly, the spatio-temporal model 104 may be received at a network node, such as a base station, where the network node may transmit instructions to the RIS controller 106 (in some examples via a control system). It will be appreciated that the spatio-temporal model may comprise a plurality of different functions which in combination may output information which the RIS 102 may use in order to configure its surface. In some examples, the spatio-temporal model 104 may be implemented on various different devices. Each or some of the functions may be performed at the same device or a different device or devices, or any combination thereof. In some examples, the network node uses the spatio-temporal model, and provides information to the RIS(s) based on the output of the spatio-temporal model on how the surface of the RIS(s) should be configured for a particular time interval. In some examples, more than one model may be used. For example, both a network node and a RIS may use a (e.g., the same) spatio-temporal model, for example, for the network node to determine whether users will be served, and the RIS to determine in which directions to direct signal.

As is described above, the RIS controller 106 may receive the spatio-temporal model 104. The RIS controller 106 may use the spatio-temporal model 104 to determine a direction in which to direct signals incident on the RIS 102 at a particular time interval of the time period. For example, the spatio-temporal model 104 may indicate for a particular region 108, a sub-region 110 which is likely to comprise users 112 of a wireless network (e.g. such as a telecommunications or Wi-Fi network) (e.g., the spatio-temporal model 104 may determine a center point of a cluster of users, where the center point may then be used to segregate the region 108 into sub-regions 110). As is illustrated in FIG. 1, in this example, in a time interval at 8 am, a sub-region **110*a* which is indicated as likely to comprise a plurality of users 112 is located proximate to a coffee shop 114. At a time interval at 1 pm, a sub-region 110*b* which is indicated as likely to comprise a plurality of users 112 is located proximate to a restaurant 116. The spatio-temporal model 104 may be developed based on historical data on users (e.g. based on GPS location of user or triangulation of users). For example, it may be determined that, each day, at 8 am, the majority of users of the wireless network can be found proximate to a coffee shop. At 1 pm, the majority of users of the wireless network can be found proximate to a restaurant. Thus, at the same time on a subsequent day, it may be determined that users will likely be proximate to the coffee shop at 8 am, and proximate to the restaurant at 1 pm. The spatio-temporal model 104** may therefore be used to predict the location of users for a given time interval, rather than the RIS relying on instantaneous information on a current location of a user during a time interval.

The RIS controller 106 may configure the RIS 102 to direct signals during a time period in at least one direction based on the spatio-temporal model 104. For example, based on the location of a sub-region indicated by the spatio-temporal model 104 for a particular time interval, the RIS controller 106 may determine at least one direction in which to direct the signals determined based on the spatio-temporal model 104 at that time interval. In particular, the RIS controller 106 may configure, or reconfigure, the plurality of elements of the RIS 102 in order that signals incident on the RIS 102 are directed in a direction which will enable the indicated sub-region of the region to be served. For example, as is illustrated in FIG. 1, at a time interval of 8 am, the RIS 102 may be configured to divert signals 118*a* incident on the RIS so that the resulting signals 120*a* are directed in a direction towards the coffee shop 114, as indicated by the spatio-temporal model. In a different time interval, at 1 pm, the RIS 102 is configured to divert signals 118*b* incident on the RIS 102 so that the resulting signals 120*b* are directed in a direction towards the restaurant 116, as indicated by the spatio-temporal model 104. In this way, the QoS of the wireless network may be improved for a majority of users within the region.

Where the examples herein refer to a user, such as the historical location, current location, or movement of a user, it will be appreciated that the location of a user may be determined based on the location of a user device such as a mobile device (e.g., the GPS location of a user device). A user device may be an electronic device. Example user devices include wearable devices (e.g., smart watches), mobile phones (e.g., smart phones), and tablets. A user device may be an extended reality (XR) device, and may be any appropriate type of device, such as a head mounted device (HMD), a tablet computer, a smartphone, smart contact lens, or the like, used either alone or in combination, configured to display or otherwise provide access to an XR environment.

FIG. 2 is an illustrative block diagram showing example system 200, e.g., a non-transitory computer-readable medium, configured to configure a reconfigurable intelligent surface, RIS, to direct signals during a time period in at least one direction based on a spatio-temporal model. The system illustrated in FIG. 2 may be a control system (such as a centralized control system or a RIS controller) for controlling one or a plurality of RISs. Although FIG. 2 shows system 200 as including a number and configuration of individual components, in some examples, any number of the components of system 200 may be combined and/or integrated as one device, e.g., as RIS controller 106 or a control system. System 200 includes computing device n-202 (denoting any appropriate number of computing devices, such as RIS controllers 106, RIS 102), server n-204 (denoting any appropriate number of servers, such as server 104), and one or more content databases n-206 (denoting any appropriate number of content databases, such as content database 106), each of which is communicatively coupled to communication network 208, which may be the Internet or any other suitable network or group of networks (e.g., such as a telecommunications network). In some examples, system 200 excludes server n-204, and functionality that would otherwise be implemented by server n-204 is instead implemented by other components of system 200, such as computing device n-202. For example, computing device n-202 may implement some or all of the functionality of server n-204, allowing computing device n-202 to communicate directly with content database n-206. In still other examples, server n-204 works in conjunction with computing device n-202 to implement certain functionality described herein in a distributed or cooperative manner.

Server n-204 includes control circuitry 210 and input/output (hereinafter "I/O") path 212, and control circuitry 210 includes storage 214 and processing circuitry 216. Computing device n-202, which may be computer, a personal computer, a laptop computer, a tablet computer, or any other type of computing device, includes control circuitry 218, I/O path 220. Control circuitry 218 includes storage 228 and processing circuitry 220. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, or any other suitable fixed or removable storage devices, and/or any combination of the same. Each of storage 214, 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 210 and/or 218 may be instructed by the application to perform the functions discussed herein. In some implementations, any action performed by control circuitry 210 and/or 218 may be based on instructions received from the application. For example, the application may be implemented as software or a set of executable instructions that may be stored in storage 214 and/or 228 and executed by control circuitry 210 and/or 218. In some examples, the application may be a client/server application where only a client application resides on computing device n-202, and a server application resides on server n-204.

The application may be implemented using any suitable architecture. For example, it may be a stand-alone application wholly implemented on computing device n-202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server n-204) or other networks (e.g., such as a network node of a telecommunications network) or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server n-204). For example, the remote server may store the instructions for the application in a storage device. The remote server may process the stored instructions using circuitry (e.g., control circuitry 210).

Server n-204 and computing device n-202 may transmit and receive content and data via I/O path 212 and 220, respectively. For instance, I/O path 212, and/or I/O path 220 may include a communication port(s) configured to transmit and/or receive (for instance to and/or from content database n-206), via communication network 208, content item identifiers, content metadata, natural language queries, and/or other data. Control circuitry 210 and/or 218 may be used to send and receive commands, requests, and other suitable data using I/O paths 212 and/or 220, such as instructions, e.g., to configure a RIS.

In some examples, the system 200 may be in communication with a network node of a communications network, such as a telecommunications or radio network. A network node, as used herein, is equipment capable, configured, arranged, and/or operable to enable wireless access or perform other functions in the (radio) communication network. A network node may directly or indirectly communicate with communication devices such as user devices, other network nodes, or equipment, in the communication network. Examples of network nodes include access points (APs) (e.g., radio access points) and base stations (BSs), such as radio base stations, Node Bs, evolved Node Bs (eNBs), and gNode Bs. Base stations may be categorized based on their coverage or transmit power level, such as femto base stations, pico base stations, micro base stations, or macro base stations. A base station may act as a relay node or a relay donor node controlling a relay. Moreover, a network node may comprise at least one part of a distributed radio base station, such as centralized digital units and/or remote radio units (RRUs), also known as Remote Radio Heads (RRHs). These RRUs may be integrated or non-integrated with an antenna, forming an antenna integrated radio. In a distributed antenna system (DAS), the parts of a distributed radio base station may be referred to as nodes. Additional examples of network nodes include multi-standard radio (MSR) equipment like MSR BSs, network controllers such as radio network controllers (RNCs) or base station controllers (BSCs), base transceiver stations (BTSs), transmission points, transmission nodes, multi-cell/multicast coordination entities (MCEs), core network nodes (such as MSCs and MMEs), operation and maintenance (O&M) nodes, OSS nodes, SON nodes, positioning nodes such as E-SMLCs, and/or MDTs. Furthermore, a network node may be a virtual network node. In general, network nodes encompass any suitable device or group of devices capable, configured, arranged, and/or operable to provide or enable user devices with access to the radio communication network or provide services to user devices that have accessed the network.

In particular, the system 200, such as the server n-204 or the computing device n-202, may receive from the network node the spatio-temporal model 104, and/or an indication of sub-regions of the regions to which signals should be directed in particular time intervals of the time period, and/or the way in which a RIS should be configured during a time interval. The system may perform a time synchronization with the network node, to ensure that both the network node and the RIS controller are synchronized in the transmitting and directing of signals.

In any of the examples herein, where reference is made to a user, for example, a spatio-temporal model of users, it will be appreciated that the methods and systems herein may equally be performed for user devices. For example, the spatio-temporal model may be a model of user devices in a region, for example, mobile devices such as mobile phones of users, or in other examples, user devices such as drones or autonomous vehicles. It will be appreciated that in the latter examples, it may be beneficial for signals to be directed to the user device rather than the user, and therefore the spatio-temporal model may be generated based on the location of user devices, and may indicate predicted locations of user devices at time intervals of a time period.

Figure 3:
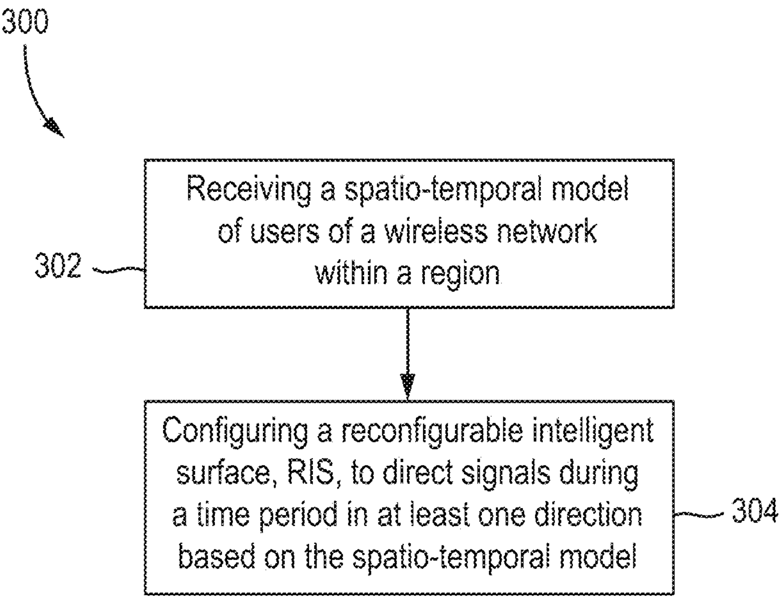
FIG. 3 is a flowchart representing a process for configuring a reconfigurable intelligent surface, RIS, in accordance with some examples of the disclosure.

FIG. 3 shows a flowchart representing an illustrative process 300 for configuring a RIS, such as the RIS shown in FIG. 1. While the example shown in FIG. 3 refers to the use of system 100, as shown in FIG. 1, it will be appreciated that the illustrative process 300 shown in FIG. 3 may be implemented, in whole or in part, on system 100, system 200, and/or any other appropriately configured system architecture. For the avoidance of doubt, the term "control circuitry" used in the below description applies broadly to the control circuitry outlined above with reference to FIG. 2. For example, control circuitry may comprise control circuitry of the RIS, control circuitry of the RIS controller, control circuitry of a control system, and/or control circuitry of a network node, working either alone or in some combination.

At 302, control circuitry, e.g., control circuitry of the RIS 102 or a RIS controller 106 or, control circuitry of a control system, receives a spatio-temporal model of users 112 of a wireless network within a region 108. The spatio-temporal model 104 of users 112 may be a traffic profile of users 112. In particular, the spatio-temporal model 104 may indicate a predicted location of users 112, and/or particular sub-regions (and/or centers of sub-regions) in which users 112 are located, at particular time intervals of a time period.

The spatio-temporal model 104 of users 112 of a wireless network within a region 108 may be a model which has been generated based on historical information on the users 112. In some examples, the historical information on a user may be determined based on historical information of a user device, such as a mobile phone, e.g., based on historical GPS locations of the mobile phone. In a further example, the location or movement of the user may be determined using a further device, such as an imaging device (e.g., a camera) which records movements of the user. The spatio-temporal model 104 may be a model which is configured to predict the location of users 112 of a wireless network within a region 108 at a particular time, based on the location of users 112 of the wireless network within the region 108 during a previous time period. In an example, the time period is a day, and a time interval is a time slot during that day. For example, the time period of a day may be divided into ten-minute time intervals. It will be appreciated that the location of users 112 within a region 108 over the course of a day may follow a particular pattern (which may be determined by training the spatio-temporal model 104). For example, where the region 108 is a mall, users 112 are likely to congregate at places that serve food at particular times, such as for a mid-day meal or an evening meal. The spatio-temporal model 104 may therefore be configured to receive a time interval of a time period and output for that time interval a prediction of the location of users 112 at that time interval. The spatio-temporal model 104 may be configured to predict the location of users 112 at a time interval for a particular type of time period. For example, the location of users 112 within a region 108 over a time period of a day such as a weekend day may differ from the location of users 112 within a region 108 over a time period of a day such as a weekday. The spatio-temporal model 104 may therefore be configured to determine or receive the type of time period of the current time period or interval, and predict the location of users 112 based on the type of time interval.

The spatio-temporal model 104 may be further configured to receive as input the current location of users 112 of a wireless network at a current time interval, and predict, based on the current location of the user at that time interval (and in some examples, based on the current trajectory of the user) the location of the user at a future, or subsequent, time interval. For example, by using flow prediction algorithms, the initial trajectory of a user may indicate where the user is likely to be at a future time interval. For example, in a mall, the direction and speed that a user has when entering the mall may give an indication of the likely heading of the user, or at least the direction in which they will travel for the next time interval, and thus it may be possible to predict a location of the user, for example, in the next 10-minute time interval. As an example, an LSTM method may use velocity, direction, time, and location information of a user(s) to predict the locations of the user(s) in the near future based on historical data.

The spatio-temporal model 104 may be further configured to receive as input information on influence factors which may influence user trajectory in the region 108. For example, an influence factor may be an event occurring with the region 108 which may alter the behavior of users 112 within the region 108 (e.g., in a mall, a sale may increase the traffic to a particular shop, whereas a shop closure may reduce the traffic in the region 108 of that shop). The spatio-temporal model 104 may be configured to indicate predicted locations of users 112 based on the received information. For example, the spatio-temporal model 104 may use historical information on the behavior of users 112 (and in some cases a current location of a user) and an influence factor in order to indicate a predicted location of at least one user.

The spatio-temporal model 104 may indicate a predicted location of at least one user within the region 108 at time intervals of the time period. For example, the time period may be divided into time intervals, or time slots, where for a given time slot, the spatio-temporal model 104 may predict locations of users 112 within the region 108. The spatio-temporal model 104 may indicate at least one sub-region 110 of the region 108 to which signals are to be directed. Where there are a plurality of sub-regions, it may be determined that signals are to be directed to more than one sub-region 110.

A sub-region 110 may correspond to a predicted cluster of users 112 within the region 108. For example, based on the predicted locations of users 112 within the region 108, a clustering algorithm may be used to determine the centers of clusters of users 112 within the region 108, where the region 108 may then be divided into sub-regions, each sub-region 110 corresponding to a cluster of users 112. In particular, a center of a sub-region 110 may correspond to a center of a cluster. The center points of locations of users 112 may be computed by taking an average of the locations of users 112 in a particular region 108 at a specific time period (for example, the region 108 may be segmented into various portions, where the average location of users 112 within a portion may be determined as being the center of that portion).

To determine the boundary of a sub-region 110, the center point(s) of a cluster(s) may be input to a Voronoi algorithm to generate a Voronoi diagram (e.g., the spatio-temporal model 104 may generate a Voronoi diagram). The Voronoi algorithm may take the centers of clusters as input and output the region 108 divided into sub-regions. The Voronoi diagram includes in a sub-region 110 all points of the region 108 which are closer the center of the sub-region 110 than to the center of any other sub-region.

Figure 4:
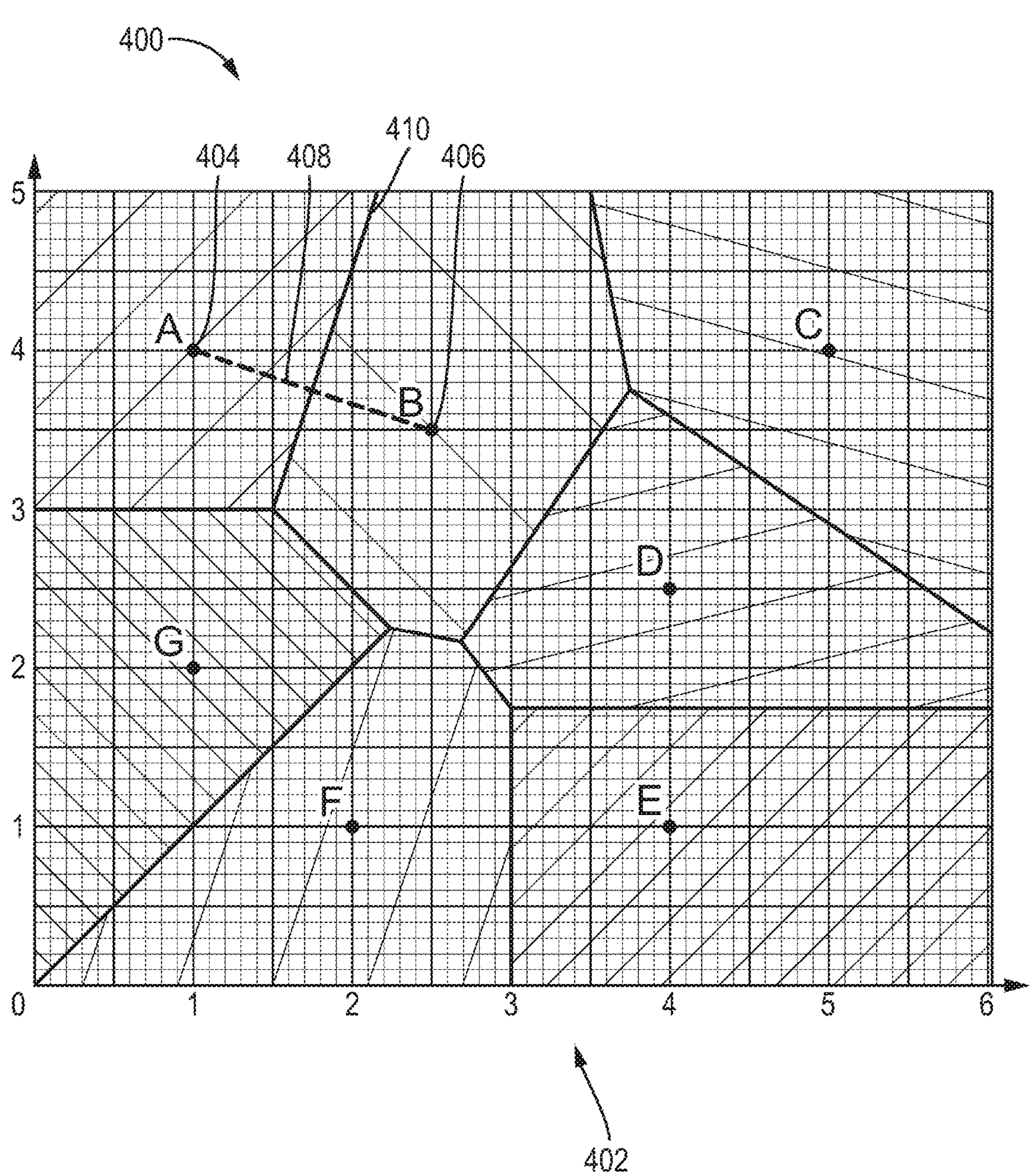
FIG. 4 illustrates an example of the division of a region into sub-regions, in accordance with some examples of the disclosure.

FIG. 4 illustrates an example of a region 108 divided into sub-regions. In particular, FIG. 4 illustrates a Voronoi diagram 400 of a region 108 comprising a plurality of sub-regions 402, labelled A to G. Briefly, to determine the boundaries of the sub-regions using a Voronoi diagram, a Voronoi algorithm determines a line connecting two adjacent center points (e.g., a line A-B 408 connecting the center points of A 404 and the center point of B 406), finds a boundary line (e.g., line 410 for the boundary between sub-regions A and B) which is perpendicular to the line A-B 408 connecting the two adjacent center points and which crosses the line connecting the two adjacent center points at an equal distance from both center points. This is repeated for each of the center points and their adjacent center points, where the boundary of sub-regions is defined by the points at which the lines first intersect another line.

Once the region 108 has been segregated into sub-regions, it may be determined to which sub-regions signals are to be directed. In one example, signals may be directed to the center of each sub-region 110 (which may correspond to the cluster centers). In an example, some sub-regions may be prioritized over other sub-regions. For example, it may be determined that some users 112 require a higher network QoS, such as users 112 who are using extended reality (e.g., mixed reality (MR), augmented reality (AR), virtual reality (VR)). For example, information may be received (e.g., at a base station) on current users 112 such as whether they are using extended reality, where this information may be input to the spatio-temporal model 104 in order that the user's requirements are considered. A larger proportion of signals may be directed to a region 108 comprising users 112 requiring a higher network QoS. In another example, priority may be given to a sub-region 110 comprising a greater number of users 112 than another sub-region. Thus, a greater proportion of signals may be directed to a sub-region 110 comprising greater number of users 112. The configuration of the sub-regions may be determined for each time interval of the time period, as the movement of users 112 within the region 108 over the time period may result in different clustering of users 112 at different time intervals, and therefore different locations of sub-regions.

At 304, control circuitry, e.g., control circuitry of the RIS 102 or a controller of the RIS, configures a reconfigurable intelligent surface, RIS 102, to direct signals during a time period in at least one direction based on the spatio-temporal model 104. For example, the RIS may be configured based on the determined location of centers of sub-regions, e.g., to direct signals to the centers of sub-regions. Where is it determined that a portion of a RIS is to be used to direct signals to a particular sub-region 110, the RIS may be configured to direct signals to that sub-region 110. In particular, as is described above, the individual elements of the RIS may be adjusted in order that the elements (or a group(s) of elements) direct signals to a particular sub-region 110.

In an example, the spatio-temporal model 104 may be used to divide a RIS 102 into a plurality of portions, where each portion of the sub-region 110 may be configured to direct signals in different directions. For example, a proportion of the RIS 102 to be configured to direct signals to a sub-region 110 of the region may be determined. In a further example, a portion of the RIS 102 which is closest to a center of a sub-region 110 is used to direct signals to that sub-region 110. For example, where there are two sub-regions, one on either side of a RIS 102, it may be determined that (elements in) one half of the RIS 102 is to direct signals to one of the two sub-regions, and (elements in) the other half of the RIS 102 is to direct signals to the other of the sub-regions. In some examples, different proportions of the RIS 102 may be used to direct signals to each sub-region 110 of a plurality of sub-regions. For example, as is described above, some sub-regions may be prioritized over other sub-regions, where a sub-region 110 may be prioritized (e.g., it may be determined that a sub-region is to be prioritized, e.g., by the base station or the RIS controller) over another sub-region 110 by assigning a greater proportion of the RIS 102 to direct signals to the sub-region 110 with the higher level of priority (e.g., a sub-region having a greater number of users, or a greater number of users requiring high QoS, may be determined to have a higher level of priority than a sub-region having fewer users, or fewer users requiring high QoS). A proportion of the RIS 102 may be assigned to a sub-region 110 by assigning a plurality of elements of the RIS 102 to direct signals to that sub-region 110.

In a further example, the spatio-temporal model 104 is used to configure a plurality of RISs to direct signals during a time period in at least one direction. For example, within a region 108, there may be a plurality of RISs provided to direct signals. Using the spatio-temporal model 104, sub-regions may be determined as described above. In an example, in the case where there is a plurality of RISs, different RISs may be assigned to serve different sub-regions. For example, a RIS 102 which is closest to a sub-region 110 (or center of a sub-region 110) may serve that sub-region 110 by directing signals towards that sub-region 110. In another example, in the case where there are a plurality of RISs, different RISs may be assigned to serve the same sub-regions (e.g., to further increase QoS in that sub-region 110). As is described above, portions of the plurality of RISs may be used to serve various sub-regions. In an example, portions of different RISs may be used to serve the same sub-region 110. In an example, a minimum number of RIS elements may be used in order to direct sufficient signals towards sub-regions. For example, there may be a predetermined threshold of network coverage required in any particular sub-region 110. A minimum number of elements of a RIS (or a plurality of RISs), and/or a minimum number of RISs, may be used in order to provide network coverage up to or over the threshold, where any elements which are not required are deactivated. In some examples, portions of the RIS 102 may be activated or deactivated to minimize signal fading and energy consumption, for example, based on the users 112 of a sub-region 110 (e.g. where the users 112 are mobile users 112, it may be determined that lower QoS is required and some portions of the RIS may be deactivated, whereas where the users 112 are MR users 112, it may be determined that higher QoS is required and some additional portions of the RIS may be activated). In an example, the plurality of RISs may be used in conjunction to direct signals to a particular sub-region 110, for example, by one RIS directing signals to another RIS, where the another RIS may then direct the signals to the sub-region 110 (e.g., multihop RIS usage).

The spatio-temporal model 104 may indicate a location comprising a user device (or a further user device, compared to a user device the location of which correlates to the location of a user such as a mobile phone) to which signals are to be directed. For example, a user device such as a television (which may also be connected to the wireless network) may be determined to be in use or likely to be used when the location of the user is proximate to the location of the television. A signal may therefore be directed to the user device (television) based on the location of the user, for example, when the user is in the same room as the television. The spatio-temporal model 104 of users 112 may therefore be used to direct signals to a user device which is proximate to, or used by, the user.

Figure 5:
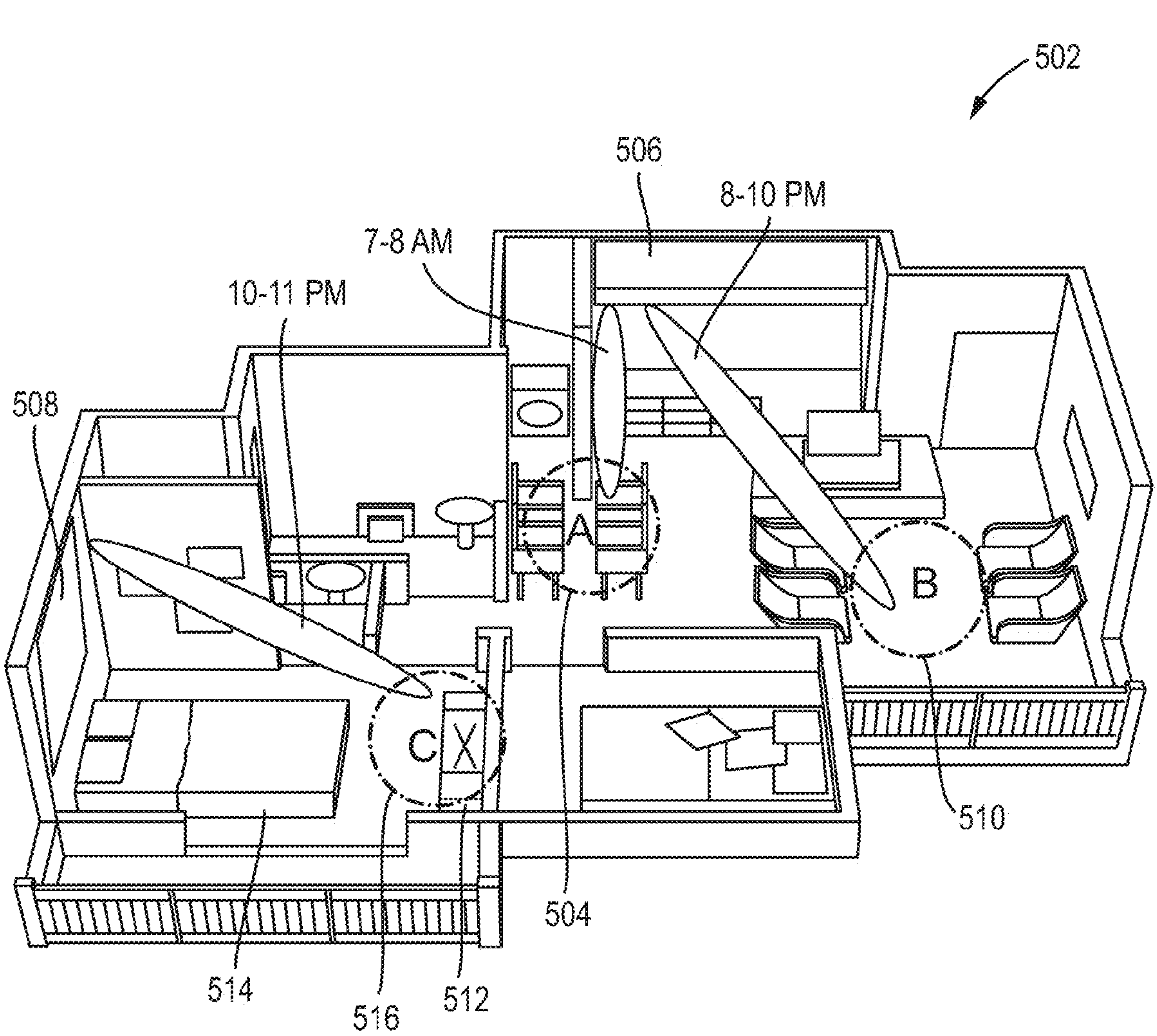
FIG. 5 illustrates an example of configuring a reconfigurable intelligent surface, RIS, to direct signals to sub-regions within a region, in accordance with some examples of the disclosure.

FIG. 5 illustrates an example of a region in which signals are to be directed. In particular, FIG. 5 illustrates an example of a region 502 (an apartment) comprising a plurality of sub-regions, labelled A, B and C (in particular, where the circles indicate a center of a sub-region), to which signals are to be directed at different time intervals over a time period of a day, as indicated by a spatio-temporal model 104.

As is shown in FIG. 5, during the hours of 7 am-8 am (e.g. comprising a time interval of one hour, or a plurality of time intervals that make up one hour), the signals are directed to sub-region A 504. In particular, based on historical user data, it has been determined that between 7 am and 8 am, the users 112 (e.g., two users 112 who live in the apartment) of a wireless network, which may be a mobile network or a Wi-Fi network, are predicted to be located at a dining table (e.g., eating breakfast). A RIS 506 is used to direct signals to the sub-region A 504. In this example a first RIS 506 and a second RIS 508 are located within the region 502. Between the hours of 7 am-8 am, the first RIS 506 is used to direct signals to the sub-region A 504, as the first RIS 506 is the closest RIS of the first RIS 506 and the second RIS 508 to the sub-region A 504. From the hours of 8 am to 7 pm, no particular sub-region is indicated as requiring beamforming, since the users 112 living in the apartment are not present (e.g., are at work). It will be appreciated that this may be the situation for particular days, such as weekdays, whereas at weekends, the locations of sub-regions and times at which they are served may differ, for example, if the model has determined based on historical user behavior that the users 112 of the wireless network are present in the apartment at different times at a weekend. From an hour of 8 pm to an hour of 10 pm, it is determined by the spatio-temporal model that the users 112 of the wireless network are predicted to be in the living area (e.g., based on historical data of the users 112). Between the hours of 8 pm to 10 pm, the first RIS 506 is used to direct signals to a sub-region B 508 (again, the first RIS 506 is closest to the sub-region B 510 out of the first RIS 506 and the second RIS 508). From an hour of 10 pm to an hour of 11 pm, it is determined by the spatio-temporal model that the users 112 are predicted to be located in the bedroom. In particular, it is determined by the spatio-temporal model that the device which is being used between the hours of 10 pm and 11 pm is a television 512. The spatio-temporal model may therefore indicate that the signals should be directed to the user device, e.g., the television 512, rather than the bed 514, which is where the users 112 are located. Between the hours of 10 pm and 11 pm, the second RIS 508 is used to direct signals to a sub-region C 516 (which is centered on the television 512).

In an example, the spatio-temporal model 104 is a trained model. A trained model may comprise any model that may be trained to take as input data such as the current time and output a prediction of the location of users 112 of a wireless network within a region 108 at that time. In some examples, the model comprises a supervised machine learning model. In another example, a model may be trained using support-vector regression, or Random-Forest regression or other non-linear regressor. In some examples, the model may comprise a random forest model or a decision tree. The model may comprise a classification model, or a regression model. The trained model may be a trained neural network. For the avoidance of doubt, neural networks are a type of supervised machine learning model that may be trained to provide an output for given input data. Neural networks may be trained by providing training data comprising example input data and the corresponding "correct" or ground truth outcome. Neural networks may comprise a plurality of layers of neurons, each neuron representing a mathematical operation that may be applied to the input data. The output of each layer in the neural network is fed into the next layer to produce an output. For each piece of training data, weights associated with the neurons may be adjusted until optimal weightings are found that produce predictions for the training examples reflecting the corresponding ground truths.

In an example, the spatio-temporal model 104 may be generated by obtaining information on the behavior of mobile users 112 as well as other regular users 112 within a region 108 over a particular time period. For example, information may be obtained on the movements of users 112 within the region 108 over the same time period each day (for example, where people are within the region 108, how long they say within particular areas, how fast they move through the region 108, and so on). Information may also be obtained on the devices used by the user, such as a mobile phone, or a television, to which signals should be directed. The model may then be trained to determine any of movement of users 112, the location of users 112, and the concentration of users 112 (within sub-regions of the region) at particular time intervals of the time period, for example, by using statistical or machine learning based approaches. For example, cameras, GPS, and/or any other triangulation techniques may be to determine the locations and movements of users 112 or user devices in an environment at a specific time or over a particular time period. Then, temporal Machine Learning algorithms, such as recurrent neural networks (RNN), long short term memory (LSTM) algorithms, may be used to learn the behavior of users 112 over the time period, such as their clustering behaviors (e.g., how or where the users 112 are grouped), for example, based on training data comprising historical data of users 112 illustrating clustering of the users 112. Higher weights may be given to historical data which is more recent than other historical data.

The model may be trained based on the type of time period. For example, where the time period is a day, the types of time period may be weekdays, weekends, and holidays. Historical user data on each of these types of day may be used in order to train the spatio-temporal model 104 to predict a location of users 112 on a corresponding type of day. For example, the spatio-temporal model 104 may comprise a plurality of models, each trained to predict the location of users 112 on different types of time period.

The movement of users 112 within a region 108 may be similar at the same time intervals each day. For example, at 8 am, users 112 may be more likely to approach a coffee shop than a restaurant. Conversely, at 1 pm, users 112 may be more likely to approach a restaurant (this example is illustrated in FIG. 1) than a coffee shop. The spatio-temporal model 104 may be trained to determine the likely location of users 112 (or user devices) at a time interval of the time period. In an example, the spatio-temporal model 104 may be further trained based on influence factors which may influence user trajectory in the region 108. For example, an influence factor may be any factor that may cause users 112 to divert from their normal pattern of behavior. In an example, a sale occurring in a particular shop may cause users 112 to visit that shop where they would typically not visit the shop. This may therefore alter the movement of users 112 within the region 108. The model may be trained using information indicating any such influence factors along with information on user movement within the region 108, so that the model may be trained to account for such events when they occur. The model may be trained to output the predicted location of users 112 at each time interval of a time period.

The model may be further trained to receive as input information on a current location of a user at a current time interval, and predict the location of the user at a future time interval. For example, the model may be trained to receive as input any of current velocity, direction, and speed of a user, where a flow prediction algorithm may be used or trained to predict a location of the user at subsequent time intervals to provide long-term movement prediction. For example, the model may be trained using training data such as data indicating that 'ten people entered a shopping mall from gate-A, 8 of them went right and 2 of them went left at 10 AM'. Alternatively or additionally, the model may be trained to receive a direction and velocity of the user and predict their location at a subsequent time interval (e.g., simply based on a direction, e.g. shop, to which they are headed) to provide a short term movement prediction.

The spatio-temporal model 104 may be configured to detect clusters of users 112 at a time interval, for example, by using a clustering algorithm. For example, based on the determined locations of users 112 within the region 108 at a particular time interval, a clustering algorithm may be used in order to determine a cluster of users 112, and a center point of that cluster. The center point of a cluster may be a location to which signals are to be directed (e.g., and may correspond to the center of a sub-region). The spatio-temporal model 104 may be further configured to divide the region 108 into sub-regions, for example, based on the determined locations of users 112. For example, for a given time interval, the spatio-temporal model 104 may be trained to output predicted sub-regions corresponding to clusters of users 112 (e.g. using Voroni algorithms and diagrams). The spatio-temporal model 104 may be further trained to determine the closest RIS (or the closest part of a RIS/RISs) to a sub-region 110 (e.g., to minimize signal fading), and trained to determine whether parts of a RIS should be activated or deactivated (e.g. based on user requirements, to minimize costs), or which portion of a RIS should be used to direct signals to a sub-region.

In an example, it may be determined that a user has a low QoS (e.g., the base station may determine that a user has low QoS), for example, because they are in a region that has fewer users, and is therefore a lower priority, or because the signals directed towards user are blocked from reaching the user, for example, by an obstacle. In an example, it may be determined that a user may benefit from a higher QoS, e.g., where the user is using extended reality. In an example, the user may be in sub-region where signals are not currently directed, or where fewer signals are currently directed, or where signals are not to be directed (or fewer signals are to be directed) in a subsequent time interval. In any of these cases, it may be determined that the user is to be notified that their experience could be improved by moving to a different sub-region (at a current time interval or a subsequent time interval). In an example, a base station may send provide feedback, such as a notification, to a user device in order to inform the user of a location with better QoS. In particular, a base station may notify the user device of the location of a center of a sub-region (e.g. the closest sub-region) having a higher QoS than the sub-region the user is currently occupying. In some examples, a base station may notify the user device of the location of a center of a sub-region having the highest QoS of sub-regions within the region. In an example, a base station may send provide feedback, such as a notification, to a user device in order to inform the user that they are moving away from a sub-region having high QoS.

Figure 6:
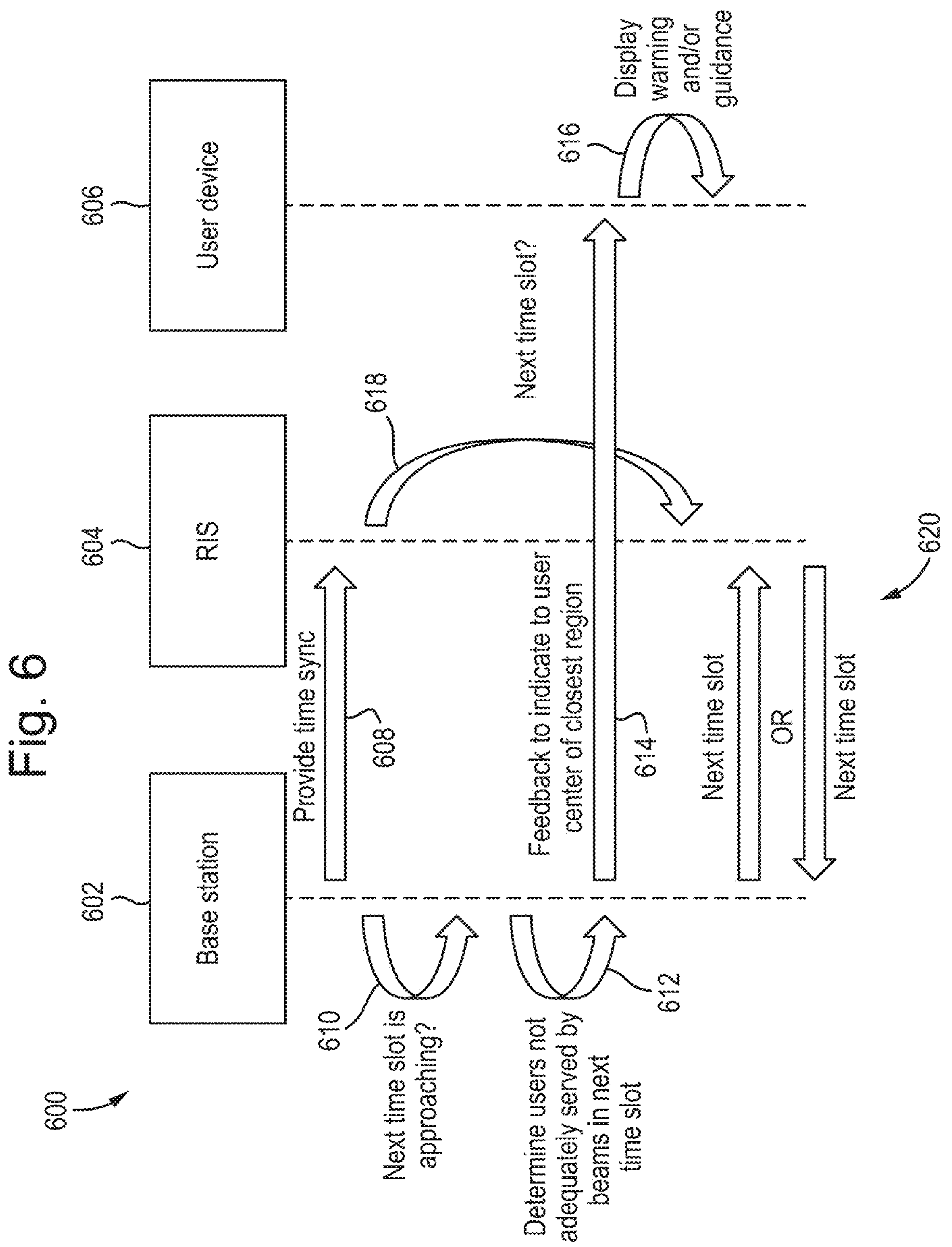
FIG. 6 illustrates a signal diagram for providing feedback to a user, in accordance with some examples of the disclosure.

FIG. 6 illustrates a signal diagram showing an example of the signaling that may be used in order to provide feedback to a user indicating a location of a sub-region to which the RIS is or will be directing signals relative to the current position of the user. In particular, FIG. 6 illustrates a base station which periodically (e.g., approximately continuously) provides UE locations to a RIS, where the RIS uses the UE location to determine a new impedance and parameters to be used to configure the plurality of elements making up the surface of the RIS in a subsequent time interval.

For example, FIG. 6 illustrates a system 600 comprising a base station 602, a RIS 604 and a user device 606. In a first step 608, a time synchronization may be provided from the base station 602 to the RIS 604 (or a RIS controller). This may enable compensation of any difference in time keeping at the RIS 604 and the base station 602. In a second step 610, the base station may determine whether the next time slot is approaching. Where it is determined that the next time slot is approaching, in a third step 612, users who will not adequately be served by the network in the next time slot may be determined (e.g., by the base station, based on the location of the user relative to the sub-region to which the RIS 604 will direct signal in the next time slot). Where a user is determined to not be adequately served in the next time slot, in a fourth step 614, feedback may be provided to the user device 606. The feedback may comprise an indication of a location of a sub-region in which the user can expect to receive better signal. In a fifth step 616, the user device 606 may display the feedback to the user. While the base station 602 is performing the second and third steps, the RIS 604 may wait for the next time slot in a sixth step 618. In a seventh step 620, the base station 602 may send an indication that the next time slot is to start to the RIS 604, or the RIS 604 may send an indication that the next time slot is to start to the base station 602. The indication that the next time slot is to start may comprise an explicit message to the RIS 604 to change its configuration, where the message is sent from the base station, and may comprise instructions on how the RIS 604 should change its configuration. The indication that the next time slot is to start may trigger the reconfiguration of the RIS 604 in order to direct signals in directions determined by the spatio-temporal model for the new time slot.

In some examples, the user may be provided with directions to the location. For example, the user device may display on a screen of the device a notification which describes the location of the sub-region in which the user may find better signal (e.g., as opposed to the signal of their current sub-region). In a further example, where the user is interacting with an extended reality device, or a device having extended reality capability (such as a mobile phone with a visual toolkit such as ARCore or ARKit, or an XR HMD), the device may indicate to the user a path to take to the sub-region with better signal. In an example, the extended reality device may receive an indication from a base station of a sub-region with a higher QoS, or a smart device connected to the extended reality device, such as a smartphone, may receive the indication from the base station, and forward the indication to the extended reality device, or instruct the extended reality device to output the indication to the user. This may be an implicit or explicit indication. For example, a user may be guided towards a center of a sub-region by providing XR utilities in the center of the sub-region, such as a Virtual-Try-On. In another example, the indication may take the form of a notification displayed to the user, such as a text notification describing the location of the sub-region of better QoS (e.g., "Move towards the coffee shop"), or may comprise a virtual indication projected into the real world, such as a virtual path.

Figure 7:
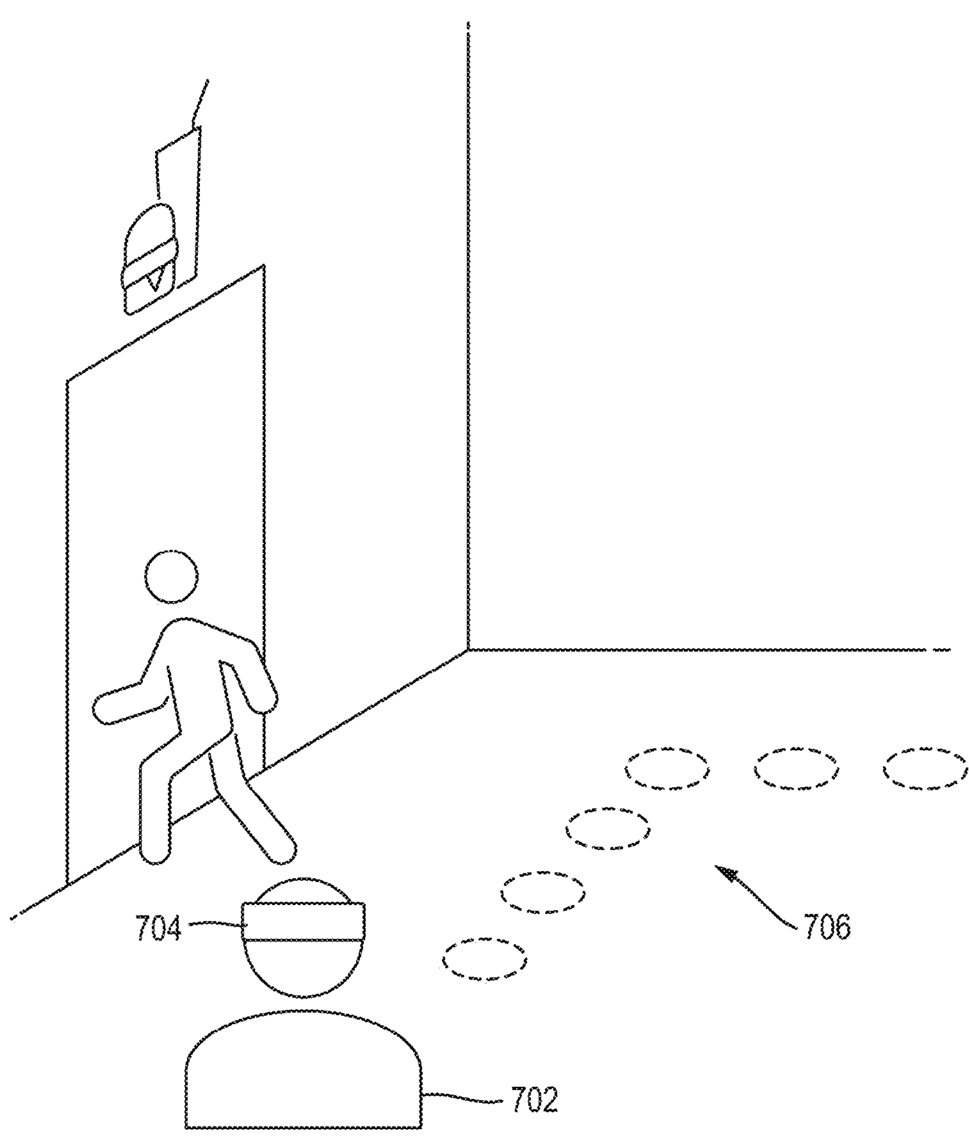
FIG. 7 illustrates an example of notifying a user of a sub-region having better QoS, in accordance with some examples of the disclosure.

FIG. 7 illustrates an example of a user 702 wearing an extended reality device 704 (in this example, a mixed reality headset). In this example, it has been determined that the user is in a sub-region which does not have as high a QoS as another sub-region, or it is determined that the user is in a sub-region which has a high QoS in this time interval, but will have a lower QoS than the current QoS in the next, or a subsequent, time interval. The extended reality device 704 provides an indication to the user of the location of a sub-region with a higher QoS. In this example, the indication takes the form of a plurality of virtual circles 706 visible to the user as being positioned on the floor which outlines a path which the user 702 could follow in order to reach the sub-region (e.g., a center of the sub-region) with better QoS.

In other examples (not shown here), the indication may take any form which directs the users to another sub-region, such as highlighting the floor of a sub-region in particular colors depending on the QoS (current or upcoming). For example, a floor of a sub-region may be highlighted in red where the sub-region has a low QoS, and the floor of a sub-region may be highlighted in green where the sub-region has a high QoS. In a further example, arrows may be used as indictors.

FIG. 8 illustrates a flow diagram representing a process 800 for configuring a RIS according to an example. At step 802, data relating to historical user trajectories in a region is received. At step 804, an influence factor is received (for example, a factor which influences user trajectory in the region). At step 806, a spatio-temporal model is trained using the received data relating to historical user trajectories and the received influence factor. At step 808, it is determined whether the training of the model is complete. If the training is not complete (NO at step 808), the process moves to step 806, and the training of the model continues. If it is determined that the training is complete at step 808 (YES at step 808), the process moves to step 810, where the spatio-temporal model is sent, for example, to a controller of a RIS, or a base station (e.g., the spatio-temporal model may be received at a controller of a RIS or a base station). Then, at step 812, a current time interval is determined (e.g., at the RIS or at a base station). For example, the current time interval may be determined by a time-sync of a RIS with a base station, or based on a clock. Once the current time interval has been determined, at step 814 it is determined whether a current location of a user has been received. Where the current location of the user has been received (YES at step 814), at step 816, the current location of the user is input to the spatio-temporal model. Then, at 818, the current time interval is input to the spatio-temporal mode. Where it is determined that a current location of the user has not been received (NO at step 814), the process moves to step 818, and the current time interval is input to the spatio-temporal model. Then, at step 820, a prediction of the location of the user at a subsequent time interval is output (e.g., by the spatio-temporal model). Based on the location of the user, at step 822, a center of a cluster of users within the region is determined, for example, using a clustering algorithm. At step 824, a sub-region of the region (e.g., the location of a sub-region) is determined (e.g., based on the center of the cluster determined at step 822). Then, at step 826, it is determined if there is more than one RIS (e.g., serving the region). Where it is determined that there is more than one RIS (YES at step 826), at step 828, a RIS closest to a sub-region of the region is selected. Then, at step 830, a proportion of the RIS (e.g., the selected RIS) which is closest to the sub-region is selected. Then, at step 832, it is determined again whether a current location of the user has been received. Where it is determined that a current location of the user has been received (YES at 832), it is then determined at step 834 whether the user is in a region which will have low signal in the subsequent time interval. Where it is determined that the user is in a region which will have low signal in the subsequent time interval (YES at step 834), it is then determined at step 836 that feedback is to be provided to the user indicating a sub-region with better signal (e.g., than the sub-region currently occupied by the user will have in the subsequent time interval). Then, at step 838 the RIS is configured to direct signals during the subsequent time period towards the sub-region. For example, the proportion of the RIS closest to the sub-region is configured to direct signals toward the sub-region. Where it is determined at step 832 that the current location of the user has not been received (NO at step 832), or where it is determined at step 834 that the user is not in a region that will have low signal in the subsequent time interval (NO at step 834), the process moves to step 838.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving, using control circuitry, a spatio-temporal model of users of a wireless network within a region; and configuring, using control circuitry, a reconfigurable intelligent surface, RIS, to direct signals during a time period in at least one direction based on the spatio-temporal model, wherein the spatio-temporal model is produced based on data relating to historical user trajectories in the region; and an influence factor which influences user trajectory in the region.

2. The method of claim 1, wherein the spatio-temporal model indicates a predicted location of at least one user within the region at time intervals of the time period, and wherein, during a time interval, the RIS is configured to direct signals in at least one direction based on the predicted location of the at least one user at that time interval.

3. The method of claim 1, wherein the spatio-temporal model indicates least one sub-region of the region to which signals are to be directed, wherein a sub-region corresponds to a predicted cluster of users within the region.

4. The method of claim 1, wherein the RIS is configured to direct signals to a center of at least one sub-region of the region based on the spatio-temporal model.

5. The method of claim 1, further comprising:

tracking movement of a plurality of users within the region over a plurality of time intervals; and determining a pattern of user position based on the tracked movement of the plurality of users within the region, wherein the spatio-temporal model is based on the determined pattern of user position.

6. The method of claim 1, wherein the method further comprises receiving a current location of at least one user, and predicting, based on the current location and the spatio-temporal model, a future location of the at least one user at a time interval of the time period, and wherein the RIS is configured to direct the signals based on the predicted future location of the at least one user at the time interval.

7. The method of claim 1, wherein the method further comprises determining a proportion of the RIS to be configured to direct signals to a sub-region of the region, and wherein a proportion of the RIS which is closest to a center of a sub-region is used to direct signals to that sub-region.

8. The method of claim 1, wherein the method further comprises configuring a plurality of reconfigurable intelligent surfaces, RISs, to direct signals in directions based on the spatio-temporal model.

9. The method of claim 1, wherein the region is divided into sub-regions, and wherein a RIS which is closest to a center of a sub-region of the region is used to direct signals to that sub-region.

10. The method of claim 1, wherein the method further comprises providing feedback to a user device indicating a location of a sub-region of the region to which the RIS is directing signals, or will be directing signals in a subsequent time interval of the time period, relative to a current position of the user device.

11. A system comprising control circuitry configured to:

receive a spatio-temporal model of users of a wireless network within a region; and configure a reconfigurable intelligent surface, RIS, to direct signals during a time period in at least one direction based on the spatio-temporal model, wherein the spatio-temporal model is produced based on data relating to historical user trajectories in the region; and an influence factor which influences user trajectory in the region.

12. The system of claim 11, wherein the spatio-temporal model indicates a predicted location of at least one user within the region at time intervals of the time period, and wherein, during a time interval, the RIS is configured to direct signals in at least one direction based on the predicted location of the at least one user at that time interval.

13. The system of claim 11, wherein the spatio-temporal model indicates least one sub-region of the region to which signals are to be directed, wherein a sub-region corresponds to a predicted cluster of users within the region.

14. The system of claim 11, wherein the RIS is configured to direct signals to a center of at least one sub-region of the region based on the spatio-temporal model.

15. The system of claim 11, wherein the control circuitry is further configured to receive a current location of at least one user, and predict, based on the current location and the spatio-temporal model, a future location of the at least one user at a time interval of the time period, and wherein the RIS is configured to direct the signals based on the predicted future location of the at least one user at the time interval.

16. The system of claim 11, wherein the control circuitry is further configured to determine a proportion of the RIS to be configured to direct signals to a sub-region of the region, and wherein a proportion of the RIS which is closest to a center of a sub-region is used to direct signals to that sub-region.

17. The system of claim 11, wherein the region is divided into sub-regions, and wherein a RIS which is closest to a center of a sub-region of the region is used to direct signals to that sub-region.

18. The system of claim 11, wherein the control circuitry is further configured to provide feedback to a user device indicating a location of a sub-region of the region to which the RIS is directing signals, or will be directing signals in a subsequent time interval of the time period, relative to a current position of the user device.

* * * * *